United States Patent [19]

Romanik, Jr.

[11] Patent Number: 5,884,239
[45] Date of Patent: Mar. 16, 1999

[54] OPTICAL SYSTEM FOR ACCURATE MONITORING OF THE POSITION AND ORIENTATION OF AN OBJECT

[76] Inventor: Carl J. Romanik, Jr., 34231 Maybird Cir., Fremont, Calif. 94555

[21] Appl. No.: 40,516

[22] Filed: Mar. 17, 1998

Related U.S. Application Data

[63] Continuation-in-part of Ser. No. 579,120, Dec. 27, 1995, Pat. No. 5,729,475.

[51] Int. Cl.⁶ .............................. G06F 5/20; G01B 11/00
[52] U.S. Cl. ......................... 702/150; 702/153; 345/158; 356/375
[58] Field of Search ..................................... 702/150, 153; 345/158; 348/203, 551; 358/296, 505, 481; 359/201, 204, 221; 356/141.1–141.5, 152.1–152.3, 375

[56] References Cited

U.S. PATENT DOCUMENTS

| | | |
|---|---|---|
| 3,484,167 | 12/1969 | Burns . |
| 3,835,249 | 9/1974 | Dattilo et al. . |
| 3,848,087 | 11/1974 | Carrell . |
| 4,024,341 | 5/1977 | Takahashi ............................... 348/203 |
| 4,123,165 | 10/1978 | Brown et al. . |
| 4,218,138 | 8/1980 | Robertsson . |
| 4,396,945 | 8/1983 | DiMatteo et al. . |
| 4,446,480 | 5/1984 | Breglia et al. . |
| 4,488,173 | 12/1984 | DiMatteo et al. . |
| 4,667,091 | 5/1987 | Gerlach . |
| 4,672,562 | 6/1987 | Egli et al. . |
| 4,672,564 | 6/1987 | Egli et al. . |
| 4,806,753 | 2/1989 | Noguchi ................................. 250/235 |
| 4,818,107 | 4/1989 | Ono et al. . |
| 4,896,962 | 1/1990 | Menn et al. . |
| 4,908,511 | 3/1990 | Ishikawa et al. ....................... 250/235 |
| 4,910,410 | 3/1990 | Workman . |
| 4,926,050 | 5/1990 | Shemwell . |
| 4,930,869 | 6/1990 | Miyagawa et al. . |
| 4,978,976 | 12/1990 | Okino ..................................... 347/235 |
| 5,059,781 | 10/1991 | Langdon . |
| 5,059,987 | 10/1991 | Takeyama et al. ..................... 347/247 |
| 5,110,202 | 5/1992 | Dornbush et al. . |
| 5,128,794 | 7/1992 | Mocker et al. . |
| 5,148,016 | 9/1992 | Murkami et al. . |
| 5,187,540 | 2/1993 | Morrison . |
| 5,227,985 | 7/1993 | DeMenthon . |
| 5,247,487 | 9/1993 | Beliveau et al. . |
| 5,285,397 | 2/1994 | Heier et al. . |
| 5,294,970 | 3/1994 | Dornbusch et al. . |
| 5,297,061 | 3/1994 | DeMenthon et al. . |
| 5,388,059 | 2/1995 | DeMenthon . |
| 5,440,392 | 8/1995 | Pettersen et al. . |
| 5,461,473 | 10/1995 | Pratt et al. . |
| 5,461,478 | 10/1995 | Sakakibara et al. . |
| 5,579,102 | 11/1996 | Pratt et al. . |

OTHER PUBLICATIONS

Baratoff, et al., "Tracking Devices," http:/www.cs.umd.edu/projects/eve/eve–articles/I.D.1.b.Tracking Devices.html (1995).

Hand, "A Survey of 3–D input devices", Technical Report CS TR94/2, (1994), Leicester, UK.

Horaud et al., "An Analytic Solution for the Perspective 4–Point Problem" *Computer Vision, Graphics and Processing*, 47:33–44 (1989).

*Primary Examiner*—Louis Arana
*Assistant Examiner*—Hien Vo
*Attorney, Agent, or Firm*—Fish & Richardson P.C.

[57] ABSTRACT

The invention provides an optical system for monitoring the position and orientation of an object in a frame of reference. The system includes at least four light sensors (or light sources) fixed on the object in a non-coplanar arrangement, each producing a signal in response to a change in the intensity of light falling on it. The system also includes an optical scanner that generates two fan-shaped light beams (or acceptance beams), oriented at an angle to each other, that scan a volume containing the object; a signal generator that provides a time signal synchronized with a specific point in the scan; a timer that records the times of position signals generated by the light sensors and time signals generated by the signal generator; and a computing device that calculates the position and orientation of the object based on the times recorded by the timer and the coordinates of the light sensors.

28 Claims, 16 Drawing Sheets

OPTICAL SYSTEM FOR ACCURATE MONITORING OF THE POSITION AND ORIENTATION OF AN OBJECT

CROSS-REFERENCE TO RELATED APPLICATION

This application is a continuation-in-part application of U.S. patent application Ser. No. 08/579,120, filed on Dec. 27, 1995, and issued as U.S. Pat. No. 5,729,475, which is incorporated herein by reference in its entirety.

BACKGROUND OF THE INVENTION

This invention relates to an optical system for the accurate monitoring of position and orientation.

Systems that measure or monitor the position and orientation of an object are important computer input devices. For example, computer monitoring of position and orientation of a user's head is required in some virtual reality systems, and is also used in some heads-up display systems. Such input devices are also useful in the manipulation of computer graphics displays, and in motion capture systems that record the movement of a person or some object.

The speed and accuracy of a position and orientation monitoring device is of critical importance in many applications. For example, virtual reality systems, in which the user is presented with a computer-generated environment through a head-mounted display, require continuous monitoring of the orientation of the user's head, updated at a rate that is fast enough to maintain the illusion of reality. Further, heads-up display systems in which information is merged with the user's visual field of view, for example, a transparent head-mounted display for a surgeon that shows the location of internal features (from X-rays or CAT scans) of a patient undergoing surgery, also require a high degree of accuracy in the continuous monitoring of the orientation of the user's head.

A number of different systems have been developed to measure position and orientation. Systems typically include devices that utilize ultrasonic emitters and detectors, or that sense magnetic field direction, or devices, such as CCD cameras, that detect images. The accuracy and speed of each system have certain limitations peculiar to its particular design. Systems capable of a high degree of accuracy and speed have been constructed, but these systems generally require the use of a complex device and costly components.

A system that accomplishes position and orientation monitoring through the sensing of scanned beams is shown by Morrison, U.S. Pat. No. 5,187,540. This system employs at least three light sensors (or emitters) and a scanning optical device that produces a pair of planar, fan-shaped, scanning light (or acceptance) beams. These beams are incident to the frame of reference from different directions, the planes of the beams being inclined to one another. The timing of the light sensor signals is processed by a computer to calculate the position and orientation of the object.

A different system, described in DiMatteo et al., U.S. Pat. No. 4,396,945, uses three light sensors (or sources or reflectors) and two optical scanners (projectors or cameras) to monitor the position and orientation of an object. Each of the three light sources, sensors, or reflectors are controlled to distinguish their respective signals. In one embodiment, one optical scanner produces a fan-shaped, planar beam that scans in only one direction, while the other scanner produces a pattern that scans in two perpendicular directions.

Another system, described in DeMenthon, U.S. Pat. No. 5,388,059, uses a single camera and at least four light sources on an object to monitor the position and orientation of the object. DeMenthon also describes an iterative computation of a 4×4 transformation matrix representing the pose of the object that provides high positional accuracy using this relatively simple design.

SUMMARY OF THE INVENTION

The invention is based on the discovery that an inexpensive, yet highly accurate and rapid position and orientation monitoring system can be made by combining a simple optical scanning device and commonly available light sensors (or sources), digital logic devices, and computing devices in a particular way.

In general, the invention features an optical system for monitoring the position and orientation of an object in a frame of reference. The system includes at least four light sensors fixed on the object in a non-coplanar arrangement, each sensor generating a position signal in response to a variation in incident light, and each sensor having known coordinates in the frame of reference of the object. The system further includes an optical scanner that generates two fan-shaped light beams, oriented at an angle to each other, e.g., at an angle of about 20, 30, 45, 60, or 90 degrees, that each scan a volume containing the object; a signal generator that generates a time signal synchronized with a specific point in the scan of at least one of the light beams; a timer that records the times of position signals generated by the light sensors and time signals generated by the signal generator; and a computing device including a memory and a processor. The two fan-shaped beams can be swept in the same or opposite directions.

In this system, the computing device is electronically linked to the light sensors, the signal generator, and the timer, and the memory is electronically linked to the processor. The memory stores a program for calculating the position and orientation of the object based on the times recorded by the timer and the coordinates of the light sensors, the processor calculates the position and orientation of the object from the times recorded by the timer, and the memory stores the results of the calculation, thereby monitoring the position and orientation of the object.

In particular, the two fan-shaped beams can be generated by two separate light sources, and the optical scanner can include two light sources that each produce a fan-shaped light beam, a motor having an axle, and a mirror fixed to the axle, all arranged so that both beams are intersected by the rotating mirror to produce a repeating pattern of two fan-shaped scanning beams that scan the volume containing the object. In particular, the signal generator can include a photo-interrupter and a light interrupting element fixed to the axle of the motor. The system can further include an output device, such as a cathode ray tube, that indicates the results of the calculation.

The optical scanner can also include two light sources that each produce a fan-shaped light beam, and a motor having an axle, wherein the two light sources are connected to the axle to produce a repeating pattern of two fan-shaped scanning beams that scan the volume containing the object.

In another embodiment, the two fan-shaped beams can be generated by a single light source. For example, the two beams, as seen by the sensors, can be generated from a single light beam alternating between two different angles. Alternatively, the optical scanner can include one light source that produces a light beam, a motor having an axle, a beam splitter, e.g., connected to the axle, and two cylindrical lenses, e.g., connected to the axle, all arranged so that the light beam is split by the beamsplitter and directed to the two cylindrical lenses to produce a repeating pattern of two, fan-shaped scanning beams that scan the volume containing the object.

In another aspect, the invention features an optical system for monitoring the position and orientation of an object in a frame of reference that includes at least four light sources fixed on the object in a non-coplanar arrangement, each source having known coordinates in the frame of reference of the object. The system further includes an optical scanner that focusses two fan-shaped acceptance beams, oriented at an angle to each other, e.g., at an angle of about 20, 30, 45, 60, or 90 degrees, onto at least one light sensor and scans the acceptance beams through a volume containing the object, the light sensor generating a position signal in response to a variation in incident light; a signal generator that provides a time signal synchronized with a specific point in the scan of at least one of the acceptance beams; a timer that records the times of position signals generated by the light sensor and time signals generated by the signal generator; and a computing device including a memory and a processor. The two fan-shaped acceptance beams can swept in the same or opposite directions.

In this system, the computing device is electronically linked to the light sensor, the signal generator, and the timer, and the memory is electronically linked to the processor. The memory stores a program for calculating the position and orientation of the object based on the times recorded by the timer and the coordinates of the light sources, the processor calculates the position and orientation of the object from the times recorded by the timer, and the memory stores the results of the calculation, thereby monitoring the position and orientation of the object.

In particular, the optical scanner can include a light sensor that detects light from both fan-shaped acceptance beams, a motor having an axle, a mirror fixed to the axle, and a pair of flat mirrors, all arranged to scan the acceptance beams through a volume containing the object. In particular, the signal generator in this system can also include a photo-interrupter and a light interrupting element fixed to the axle of the motor. The system can further include an output device, such as a cathode ray tube, that indicates the results of the calculation.

The invention also features either of these optical systems in which the object is a headgear, e.g., a helmet or spectacles, for a person's head, the headgear including a visual display electronically linked to the computing device and mounted on the headgear to provide a scene to the person. In such a system, the computing device calculates the scene based on the position and orientation of the headgear within the frame of reference, and generates the scene on the visual display.

In another embodiment, the object is a controller electronically linked to the computing device, and the optical system further includes an output device electronically linked to the computing device. In this system, the output device displays a three-dimensional image, and the computing device calculates the three-dimensional image based on the position and orientation of the controller within the frame of reference, and generates the image on the output device.

Further, the object can be a controller electronically linked to the computing device. In this system, the optical system includes an output device electronically linked to the computing device, wherein the output device displays a cursor image, and wherein the computing device calculates the position of the cursor image based on the position and orientation of the controller within the frame of reference.

Alternatively, the optical system can further include a positioning device electronically linked to the -computing device. In this system, the positioning device controls the physical position and orientation of an item in the item's frame of reference, and the computing device calculates and controls the position and orientation of the positioning device in the item's frame of reference based on the position and orientation of the object within the object's frame of reference.

In another aspect, the invention features a method of monitoring the position and orientation of an object in a frame of reference. The method includes the steps of: fixing at least four light sensors on the object in a non-coplanar arrangement to provide each sensor with known coordinates in the frame of reference of the object, wherein each sensor generates a position signal in response to a variation in incident light; locating the object so that at least four of the light sensors are within a volume scanned by an optical scanner, the scanner generating two fan-shaped light beams, oriented at an angle to each other, that each scan a volume containing the object; generating a synchronization signal that is synchronized in time with a specific point in the scan of at least one of the light beams; recording the times of position signals from the light sensors and the synchronization signal; and calculating the position and orientation of the object based on the recorded times of position signals from the light sensors, the synchronization signal, and the coordinates of the light sensors in the frame of reference of the object. This method can also be carried out using four light sources as described below.

Accordingly, several objects and advantages of this invention are to provide a system:

(a) that accurately monitors the position and orientation of an object through the timing of light sensor (or light source) signals in a region scanned by a light beam (or acceptance beam) originating from a single source;

(b) that operates with a high degree of accuracy at a high rate of speed;

(c) that can be implemented inexpensively, e.g., by using a simple optical scanning device and commonly available light sensors, digital logic devices, and computing devices;

(d) that can monitor large changes in position through the use of a single-source optical scanner that is capable of scanning a large volume of space; and (e) that can monitor a large range of orientations by allowing the use of four or more detectors.

As used herein, the words "light" and "optical" should be understood to include all types of electromagnetic radiation.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present application, including definitions, will control.

Other features and advantages of the invention will be apparent from the following detailed description, and from the claims. In addition, the materials, methods, and examples below are illustrative only and not intended to be limiting.

DETAILED DESCRIPTION

Figure 1:
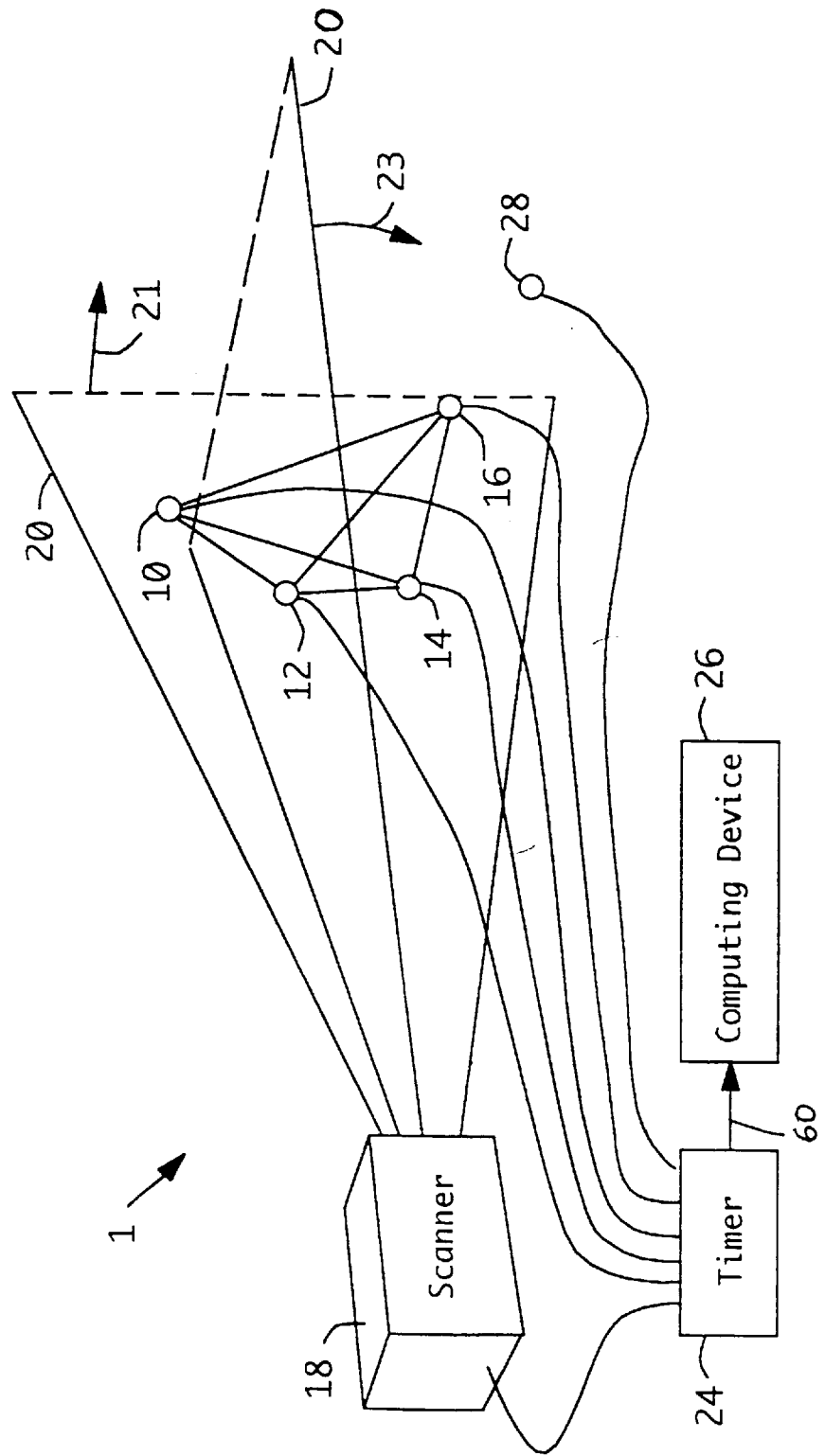
FIG. 1 is a schematic of a system for monitoring the position and orientation of an object utilizing scanning light beams and at least four light sensors.

The invention provides an optical system for the accurate monitoring of the position and orientation of an object over a large range of motion, for example, by sensing scanned light beams produced by a simple optical scanning device.

In general, one embodiment of the system includes at least four light sensors, such as photodiodes, arranged in a fixed, non-coplanar arrangement on the object to be monitored. The system also includes an optical scanning device that scans a volume of space with a focused, fan-shaped beam in a direction substantially perpendicular to the long dimension of the beam, first in one direction, and then in a substantially perpendicular direction. In addition, the system can use an optical scanning device that produces two fan-shaped beams, oriented at an angle to one another, each of which can be scanned in the same direction (left to right in FIG. 11), or in opposite directions.

In addition, the system requires a signal that is synchronized with the scanning pattern. This synchronization signal can be provided by the scanning device or by a light sensor located in a fixed location within the scanned area.

Each light sensor produces a signal when hit by the scanning beam. The times of the signals from the four sensors located on the object and the time of the synchronization signal are recorded by a device such as a digital circuit that includes a clock, counter, and memory, or a microprocessor with an internal timer. This time information is then read by or transmitted to a computing device, e.g., a microprocessor, for subsequent calculations, or the calculations are carried out directly in the same microprocessor that performs the time measurements.

In another embodiment, the system includes at least four light sources in a non-coplanar arrangement on the object and a device that scans a volume of space with a fan-shaped acceptance beam onto at least one light sensor, with a synchronization signal, a timer, and computing device operated in the same way as described above. As an alternative, a device can be used that scans a volume of space with two fan-shaped acceptance beams, oriented at an angle to one another, each of which is scanned in the same or in opposite directions.

The first step in the computer analysis of the timing information is to calculate the two angles that give the direction ("angular direction") of each light sensor (or source) relative to the frame of reference of the light beam (or acceptance beam) scanner. When the scanning pattern has a high degree of linearity, that is, when the beams are (i) planar, (ii) scan at a constant angular rate perpendicular to their long dimensions, and (iii) are perpendicular to one another, the angles are linearly related to the timing information.

When the beams are oriented to each other at an angle that is not perpendicular, and/or are scanned in non-perpendicular directions, the mathematical relationship between the angles and the timing information will, in general, be more complicated, involving trigonometric functions that depend on the particular geometry of the scanning beams (e.g., scan and orientation angles). In this case, it is not necessary to find the actual mathematical relationship, because a calibration procedure (as described below) is sufficient to establish an accurate relationship between the angles and the timing measurements.

If the scanner produces a scanning pattern that has a complicated geometry (non-perpendicular beams or scan directions) and/or the pattern suffers from other non-ideal properties (e.g., nonplanar beams), but which still repeats itself accurately, an accurate measure of the angular direction of each light sensor (or source) relative to the frame of reference of the scanner can be obtained by a calibration procedure. This calibration procedure begins by measuring the timing of the scanning beams at various known angular directions within the scanning pattern. These measurements are then used to construct a table that relates the true angles to the times, or are used to fit a non-linear equation to the data. The angles can then be estimated by using interpolation from the table or calculated from the non-linear equations.

The calculation of the position and orientation of the array of four light sensors (or sources) from the angles that give the direction to each sensor (or source) has previously been studied in the literature. This problem is also faced in position and orientation monitoring devices that use imaging detectors, where the positions of light sources are obtained from an image formed in a camera. One solution to the problem is given in Horoud et al., "An Analytical Solution for the Perspective 4-Point Problem," *Computer Vision, Graphics, and Image Processing*, 47:33–44, 1989. This solution is fairly complex, and requires significant computer power for use in real-time applications.

DeMenthon U.S. Pat. No. 5,388,059, provides a computationally inexpensive solution that gives an accurate solution to this problem. This solution uses an iterative method to solve for position and orientation, and usually requires only a few iterations of a simplified set of equations to obtain a highly accurate solution. The advantage of this solution over previous solutions is that it can be carried out quickly with less computing power. This solution is well suited for use in the present invention, and allows for the rapid and accurate computation of the position and orientation of the object from the angles of direction to each sensor (or source).

A particular embodiment of the system is illustrated in FIG. 1, which shows a system 1 including at least four light sensors 10, 12, 14, and 16 affixed to an object (not shown) in a known, fixed, non-coplanar arrangement. Each light sensor includes a photodiode and signal conditioning circuitry which together produce an electrical signal in response to a change in the intensity of light falling on the sensor. An optical scanner 18 scans a volume of space with a well focused, fan-shaped beam 20 (see FIG. 2) in a direction substantially perpendicular to the long dimension of the beam, first in one, e.g., horizontal, direction 21, and then in a substantially perpendicular, e.g., vertical, direction 23.

The optical scanner 18 also produces a synchronization signal that is in phase with the scanning pattern. For example, the signal can indicate the precise time when the vertical scan 23 of beam 20 is beginning. An optical scanner that performs these functions is described below in reference to FIG. 2. Alternatively, a synchronization signal can be provided by placing an additional light sensor 28 at a fixed location within the area scanned by the light beams.

Figure 11:
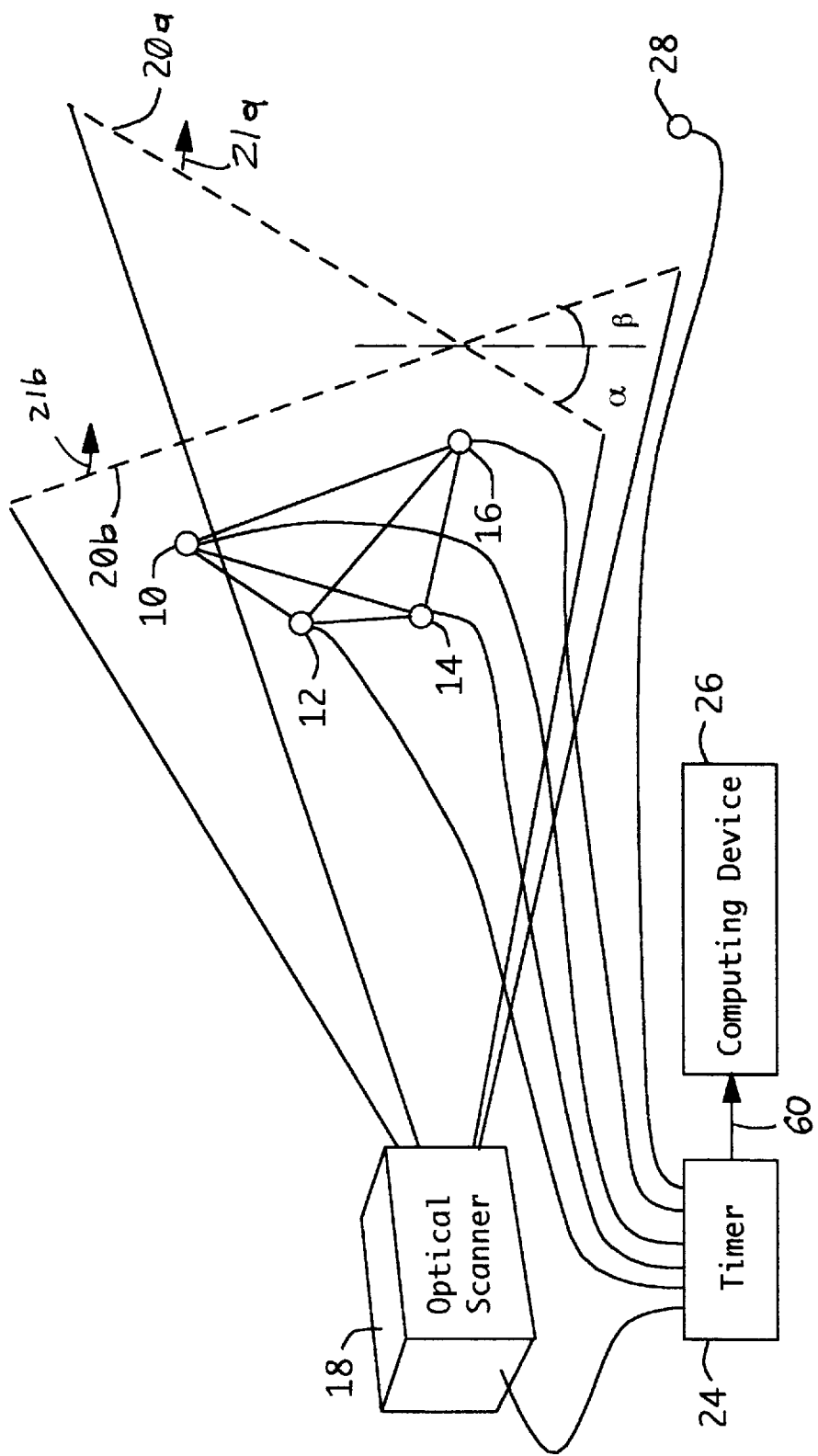
FIG. 11 is a schematic of a generalized system for monitoring the position and orientation of an object utilizing a light beam scanner that scans two fan-shaped beams that are at an angle to one another, scanning in the same direction, and at least four light sensors.

FIG. 11 shows another embodiment of the system, in which system 11 includes at least four light sensors 10, 12, 14, and 16 affixed to an object (not shown) in a known, fixed, non-coplanar arrangement. As in FIG. 1, each light sensor includes a photodiode and signal conditioning circuitry which together produce an electrical signal in response to a change in the intensity of light falling on the sensor. An optical scanner 18 scans a volume of space with two well focused, fan-shaped beams, 20a and 20b, oriented at an angle to one another (as measured by $\alpha+\beta$), each of which is scanned in the same direction as shown by arrows 21a and 21b (left to right in the figure). Beam 20a is set at an angle $\alpha$ from vertical, and beam 20b is set at an angle $\beta$ from vertical. As in the system shown in FIG. 1, optical scanner 18 can produce a synchronization signal that is in phase with the scanning pattern.

It has been found that the second kind of scanning pattern, with two beams oriented at an angle to one another and scanned in the same direction, can give results nearly as accurate as systems in which the one or more scanning beams are scanned in different directions. It has also been found that this two-beam scanning pattern can be achieved with simpler scanner designs as described in further detail below.

Figure 4:
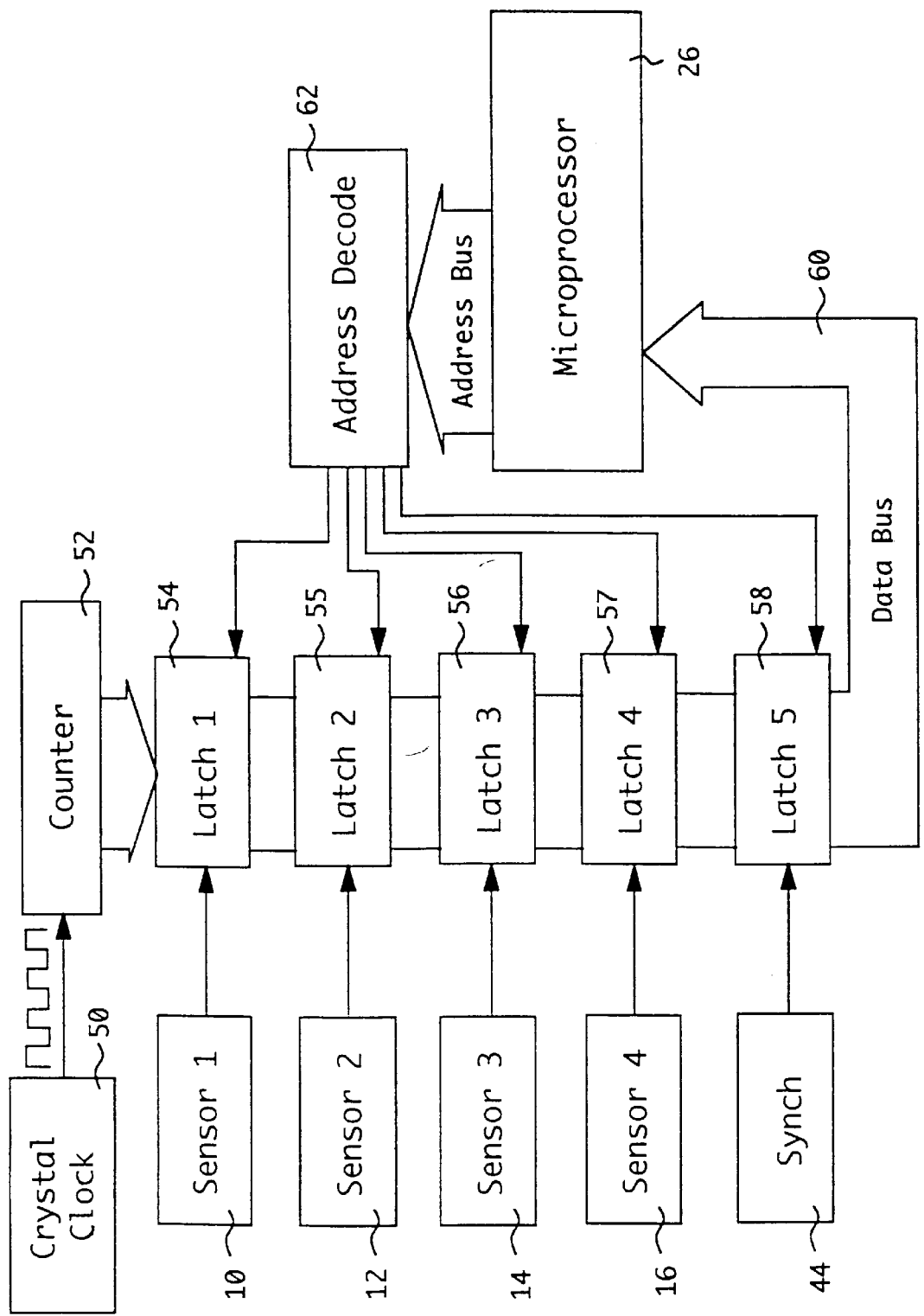
FIG. 4 is a diagram of a digital circuit that performs the function of the timer shown in FIG. 1.

A timer 24 in either system measures the timing of the signals from the light sensors 10 to 16 and the synchronization signal using an accurate clock. The timer 24 can be constructed from digital logic devices as shown in FIG. 4, comprising a crystal clock 50, a counter 52, and storage latches 54, 55, 56, 57, and 58, and address decoding logic 62. Many microcontrollers and microprocessors have integrated internal timing systems which are basically the same as the digital timing circuit shown in FIG. 4. A microcontroller such as the M68HC11, manufactured by Motorola, includes a crystal controlled clock and event capture capability, and can be used as the timer.

As shown in FIGS. 1 and 11, the times recorded by the timer 24 are read by or transmitted over a communications channel, e.g., a data bus 60, to a computing device 26 which is capable of mathematical computation. Since timer 24 itself may be a microcontroller or a microprocessor, it may be capable of carrying out some or all of the subsequent computational analysis of the timing signals. In this case, the information transmitted to the computer 26 can be the final results of the calculation (the position and orientation of the object), or some intermediate result of the calculation in the case where the computational load is shared between timer 24 and computer 26.

The computing device 26, and/or the timer 24 as described above, carries out a computation to derive an accurate estimate of the position and orientation of the object from the times recorded by timer 24, and the coordinates of the light sensors in the frame of reference of the object. This calculation is coded in a computer program that is understood by the computing device. The first step in the computation is to calculate the two angles that give the direction of each light sensor 10 to 16 relative to the optical scanner. When the scanning device has a high degree of linearity, that is, when the beams are planar, perpendicular to each other, and scan perpendicularly at a constant angular rate, a linear relationship exists between the angles and the times.

If $T_S$ is the time of the synchronization signal, $T_{x1}$, $T_{x2}$, $T_{x3}$, and $T_{x4}$ are the times of the four sensor signals during the horizontal scan, and $T_{y1}$, $T_{y2}$, $T_{y3}$, and $T_{y4}$, are the times of the four sensor signals during the vertical scan, the angles $\theta$ and $\phi$ can be calculated from these times by:

$$\theta_i = \omega(T_{xi} - T_{x0} - T_S) \qquad (1)$$

$$\phi_i = \omega(T_{yi} - T_{y0} - T_S)$$

where $\omega$ is the angular scanning rate (in degrees per second), $T_{x0}$ and $T_{y0}$ set the zero point of the angular coordinate system, and i=1, 2, 3, 4 (or more in the case of additional light sensors). The angular scanning rate may be a known quantity, or can be calculated from the time elapsed between successive synchronization signals since the angular scanning rate is proportional to the inverse of the time difference between successive synchronization signals. The exact relationship between the scanning rate and the synchronization signal times depends on the design of the scanner, and can be determined by those skilled in this field.

For scanning devices in which the scanning beams and/or scanning directions are not perpendicular, more complicated mathematical relationships can be found that relate the timing measurements to the angles. However, when the optical scanner produces a scanning pattern that is more complicated (e.g., non-perpendicular beams and/or scan directions) than the perfectly "linear" case described above, and/or includes other imperfections such as a beam that is not exactly a plane, it is not necessary to find the exact mathematical relationship between the timing measurements and the angles to obtain an accurate measurement of the angles. In this case, a calibration procedure can be used in which the times of the scanning beams hitting a sensor relative to the synchronization signal are measured at a number of known angular directions relative to the optical scanner. These measurements are then used to construct a table that relates the true angles to the times, or are used to fit a non-linear equation to the data.

For example, one can calculate the values of the coefficients A to L that give the best fit to the calibration measurements in the following least squares fitting functions:

$$\theta_i = A + BT_x + CT_y + DT_xT_y + ET_x^2 + FT_y^2 \quad (2)$$

$$\phi = G + HT_x + IT_y + JT_xT_y + KT_x^2 + LT_y^2$$

where $\theta$ and $\phi$ are the measured angles of a calibration point, and $T_x$ and $T_y$ are the times recorded for the calibration point, after subtracting the time of the synchronization signal. In this example, the values of $\theta$, $\phi$, $T_x$, and $T_y$ are measured for six or more different angular directions relative to the scanning device, and the least squares fitting function is used to provide the values of A to L that minimize the errors arising from fitting the equations to the measurements. At least six measurements are required to insure that a solution of the least squares fitting function can be obtained. These fitting functions (2) have been found to provide good results with the optical scanner shown in FIG. 2. The choice of functions used for the calibration is not unique, as a number of different functions can be fit to the calibration data. An appropriate choice of functions for the calibration of other scanning designs can be made by those skilled in this field.

A computation is then carried out to calculate position and orientation of the sensor array from the angular directions of four sensors relative to the scanning device. The preferred method of solution utilizes equations used in DeMenthon, U.S. Pat. No. 5,388,059 (the "DeMenthon patent"), which describes a computationally inexpensive method to solve the so-called "perspective 4-point problem." The DeMenthon patent applies this solution to the computation of position and orientation of an object from the positions of point images $x_i$ and $y_i$ in the focal plane of a camera with focal length f.

To convert the equations in the DeMenthon patent for use in the present invention, the equations $x_i = f \cdot \arctan(\theta_i)$, and $y_i = f \cdot \arctan(\bullet_i)$ are used to translate the angles $\theta_i$ and $\phi_i$ into the positions $x_i$ and $y_i$, which represent the positions of the images of the light sensors (10, 12, 14, 16) in the focal plane of the camera when using an optical scanner 18 rather than a camera as used in the DeMenthon patent.

The solution then follows that described in the DeMenthon patent, with the positions of DeMenthon's light sources replaced by the positions of the light sensors in the present invention. The results obtained from this calculation consist of a 3×3 rotation matrix and a translation vector which can be grouped into a single 4×4 transformation matrix P, which will be called the pose matrix in the following text.

A brief description of the calculation is given here as it applies to the present invention. In a preliminary phase of the calculation, the coordinates u, v, and w of each light sensor must be measured in the coordinate system of the object. It is preferred that this data is encoded into a computer program which carries out the following calculations.

A 4×4 matrix A is created in which each row consists of the three coordinates of each light sensor with the last element being 1 (one). The inverse matrix B ($B = A^{-1}$) of this matrix is computed and is called the object matrix in the following text. An inverse of matrix A will uniquely exist when the light sensors are non-coplanar. The object matrix depends only on the positions of the sensors relative to the object, and will not vary in most practical applications. This matrix can be precomputed for a given set of light sensors once positioned on an object, and is assumed to be composed of fixed quantities in the subsequent calculations.

The goal of the calculation to monitor the position and orientation of the object is to compute the pose matrix P, which consists of a 3×3 rotation matrix and a translation vector T:

$$P = \begin{bmatrix} i_u & i_v & i_w & T_x \\ j_u & j_v & j_w & T_y \\ k_u & k_v & k_w & T_z \\ 0 & 0 & 0 & 1 \end{bmatrix} \quad (3)$$

This matrix allows one to obtain the coordinates of a point on the object in the coordinate system of the optical scanner (u', v', w') from the coordinates of the point in the coordinate system of the object (u, v, w) by multiplying the coordinate vector of the point by the matrix P, with the coordinate vector having an added fourth element equal to 1 (one):

$$\begin{bmatrix} u' \\ v' \\ w' \\ 1 \end{bmatrix} = P \begin{bmatrix} u \\ v \\ w \\ 1 \end{bmatrix} \quad (4)$$

The solution for the pose matrix proceeds by an iterative algorithm, which is based on the relationship:

$$AP^T = \begin{bmatrix} x''_1 & y''_1 & z''_1 & 1 \\ x''_2 & y''_2 & z''_2 & 1 \\ x''_3 & y''_3 & z''_3 & 1 \\ x''_4 & y''_4 & z''_4 & 0 \end{bmatrix} \quad (5)$$

where $x_i''$, $y_i''$, and $z_i''$, are the locations of the four light sensors in the coordinate system of the scanner. A is the sensor coordinate matrix in the coordinate system of the object, and $p^T$ is the transpose of the pose matrix P. This equation derives from equation (4) and the matrix property $PA^T = (AP^T)^T$. The previously defined quantities $x_i$ and $y_i$ can be expressed in terms of $x_i''$, $y_i''$, and $z_i''$ as follows:

$$x_i = x_i''/z_i'' \quad y_i = y_i''/z_i'' \quad (6)$$

We introduce new quantities $x_i'$ and $y_i'$:

$$x_i' = x_i''/T_z \quad y_i' = y_i''/T_z \quad (7)$$

where $T_z$ is the Z coordinate of the origin of the object coordinate system expressed in the coordinate system of the scanner (the z displacement of the object continued in the pose matrix). We also introduce the small quantities $\epsilon_i$, which may be taken as equal to zero in an initial iteration of the calculation:

$$\epsilon_i = (z_i''/T_z) - 1, \quad (8)$$

which gives $$x_i' = x_i(1+\epsilon_i), \quad y_i' = y_i(1+\epsilon_i).$$

Substituting equation (7) into equation (5), and multiplying both sides by $B = (A^{-1})$:

$$Q = P^T/T_z = B \begin{bmatrix} x'_1 & y'_1 & z'_1 & \dfrac{1}{T_z} \\ x'_2 & y'_2 & z'_2 & \dfrac{1}{T_z} \\ x'_3 & y'_3 & z'_3 & \dfrac{1}{T_z} \\ x'_4 & y'_4 & z'_4 & 0 \end{bmatrix} \quad (9)$$

where we have further introduced a matrix $Q = P^T/T_z$. Since we only have estimates for $x_i'$ and $y_i'$, we can find only the first two columns of Q, $Q_{i1}$, and $Q_{i2}$. We can also find a good estimate for $T_z$:

$$T_z \approx S_z = 1/\sqrt{Q_{11}^2 + Q_{21}^2 + Q_{31}^2} \tag{10}$$

$$T_z \approx R_z = 1/\sqrt{Q_{12}^2 + Q_{22}^2 + Q_{32}^2}$$

from the conditions on the pose matrix; namely $P_{11}^2 + P_{12}^2 + P_{13}^2 = 1$ and $P_{21}^2 + P_{22}^2 + P_{23}^2 = 1$. The first two rows of the pose matrix will be estimated from the first two columns of matrix Q:

$$P_{1n} = S_z Q_{n1} \text{ and } P_{2n} = R_z Q_{n2}$$

The third row of the rotation matrix can be found from another condition on the rotation matrix, namely k=i×j, that is, the third row of the rotation matrix is equal to the cross-product of the first two rows. At this point, we can make improved estimates for the small quantities $\epsilon_i$ for use in the next iteration:

$$\epsilon_i = (1/T_z) P_3 A - 1 \tag{11}$$

where we have used the relationship $z_i'' = P_3 A$ and equation (8).

In summary form, the solution for the pose matrix proceeds by an iterative algorithm, as follows:

1. $\epsilon_i = 0$, for i=1, 2, 3, 4; or $\epsilon_i$ can be obtained from previous iteration.
2.

$$Q_1 = B \begin{bmatrix} x'_1 \\ x'_2 \\ x'_3 \\ x'_4 \end{bmatrix} \quad Q_2 = B \begin{bmatrix} y'_1 \\ y'_2 \\ y'_3 \\ y'_4 \end{bmatrix}$$

with $x_i' = x_i(1+\epsilon_i)$, $y_i' = y_i(1+\epsilon_i)$, $x_i = \arctan \theta_i$, $y_i = \arctan \phi_i$, and where B is the object matrix.

3.

$$S_z = 1/\sqrt{Q_{11}^2 + Q_{12}^2 + Q_{13}^2}$$

$i = S_z(Q_{11}, Q_{12}, Q_{13})$
$P_1 = (i_u, i_v, i_w, S_z Q_{14})$ $$R_z = 1/\sqrt{Q_{21}^2 + Q_{22}^2 + Q_{23}^2}$$

$j = R_z(Q_{21}, Q_{22}, Q_{23})$
$P_2 = (j_u, j_v, j_w, R_z Q_{24})$.

4.
k=i×j
$T_z = (S_z + R_z)/2$
$P_3 = (k_u, k_v, k_w, T_z)$
$\epsilon = \{1/T_z\} P_3 A - 1$
where $\epsilon = (\epsilon_1, \epsilon_2, \epsilon_3, \epsilon_4)$, and A is the sensor coordinate matrix.

5. A test is done to determine if the method has converged to a result. For example, if the change in the $\epsilon_i$ from the previous iteration is smaller than some predetermined tolerance value, e.g., a change of 1 percent, then convergence has occurred. Convergence criteria will depend on the accuracy desired and the precision inherent in the timing measurements and calibration process. If convergence has occurred, go to step 6, otherwise go to step 2.

6. $P_1$, $P_2$, $P_3$, and $P_4 = (0, 0, 0, 1)$ are the rows of the pose matrix P.

The capabilities of the system can be enhanced by employing more than four light sensors. First, the use of additional light sensors allows the detection of the beams by at least four light sensors over a larger range of motion of the object. Second, the use of additional light sensors also increases the accuracy of the system. The calculation of position and orientation as described above utilizes the timing of light signals from four and only four sensors, and depends on the positions of those sensors in the coordinate system of the object. In a system with more than four light sensors, the calculation can be carried out for any or all subsets of four non-coplanar sensors, where the calculation depends on the coordinates of the particular subset of sensors employed. An initial step of the calculation can be used to select a particular subset of the sensors that are used in the calculation, for example, choosing the four sensors closest to the center of the scanning region. Another approach is to perform the calculation for multiple subsets of four sensors (when more than four sensors register light signals), and then performing an average of the result, to improve the overall accuracy.

FIGS. 2 and 3a to 3c illustrate an optical scanner 18 that generates a fan-shaped light beam 20 that is scanned in two directions, and a signal generator 19 that generates a synchronization signal that fulfills the requirements of this invention. A light source 30 produces a sharply focused fan-shaped light beam 20. This fan-shaped beam can be produced by a laser diode and a line-generating optical element such as a cylindrical lens. A rotating mirror polygon 32 with flat sides reflects the light beam 20 toward angled flat mirrors 34 and 36.

The rotation of the mirror polygon 32 causes a constantly varying angle of reflection at the line of first reflection 38 on one of the mirrors of the polygon 32. The axis of rotation 33 of the mirror polygon 32 is substantially, but not exactly, parallel to the line of first reflection 38. This orientation causes light beam 20 to alternatively scan first across flat mirror 36 (FIG. 3b), then flat mirror 34 (FIG. 3a), causing a second reflection 40. The arrangement of mirrors 32, 34, and 36, is such that the resulting light beam moves in a way that scans a volume of space (off to the left in FIGS. 2 and 3c), first in one, e.g., horizontal, direction 21, and then in a substantially perpendicular, e.g., vertical, direction 23. This pattern repeats as the revolution of the polygon mirror 32 brings each face in contact with the light beam 20, the number of repetitions per revolution being equal to the number of faces of the polygon. A motor 42 provides the rotational motion of the polygon mirror. The arrangement of the light source, motor, mirror polygon, and flat mirrors shown in FIGS. 3a to 3c provides a scanning pattern that allows for the operation of the invention. The exact values of the angles shown in FIGS. 3a to 3c are not critical, and other scanning patterns that provide the two overlapping scans of a single beam necessary for the invention can be achieved with arrangements in which the angles differ from the values given.

Figure 2:
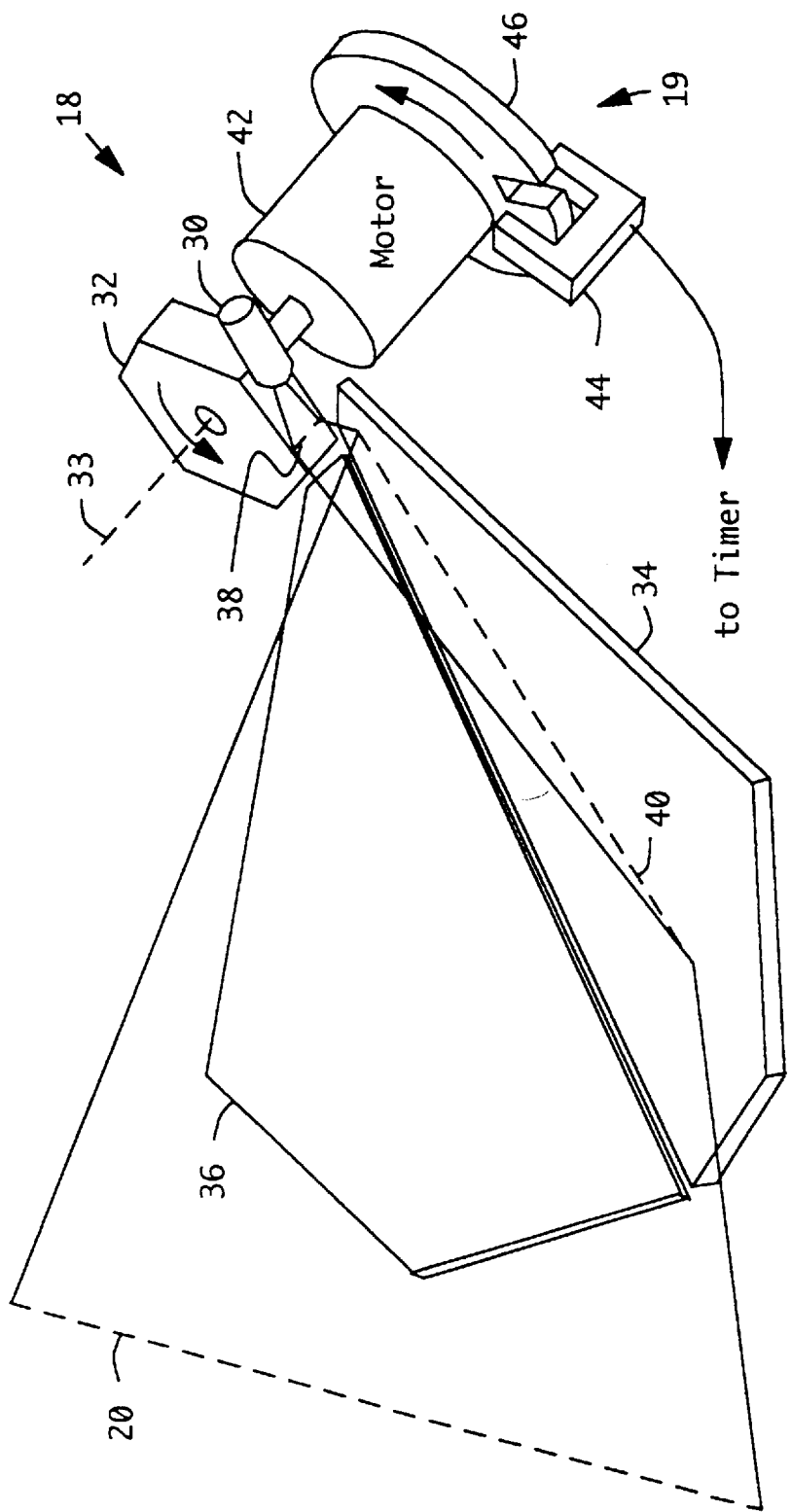
FIG. 2 is a schematic of an optical scanning device that generates the scanning pattern and synchronization signal required by the system shown in FIG. 1.
Figure 3C:
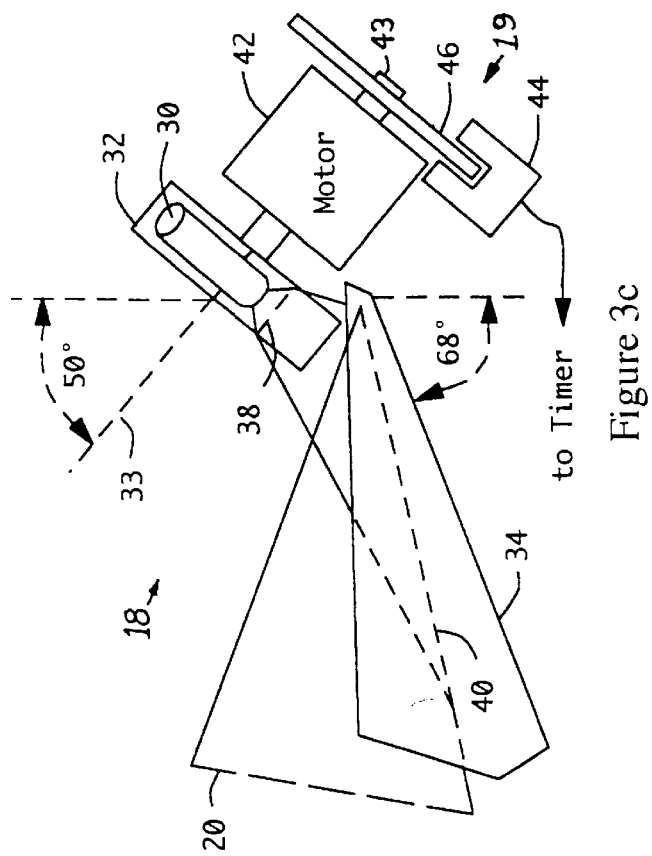
FIGS. 3a to 3c are schematics showing various perspective views of the device of FIG. 2.
Figure 3A:
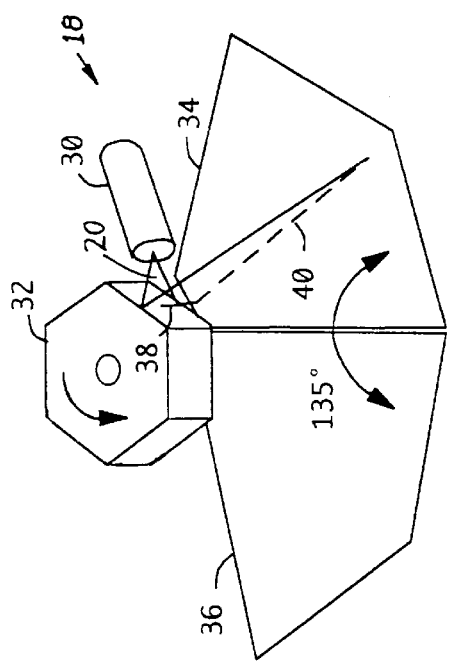
Figure 3B:
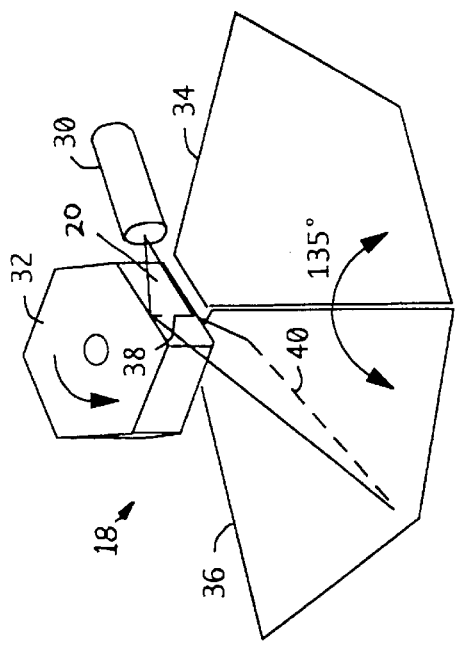

As shown in FIGS. 2 and 3c, a signal generator 19 produces a synchronization signal by the combination of a photo-interrupter 44 and a rotating slotted disk 46 fixed to the motor axis 43. The photo-interrupter 44 produces a signal whenever the space between the two arms is blocked by an opaque object. The rotating slotted disk 46 causes such a signal to occur once per revolution of the motor, the signal being exactly in phase with the movement of the polygon mirror 32.

Figure 12:
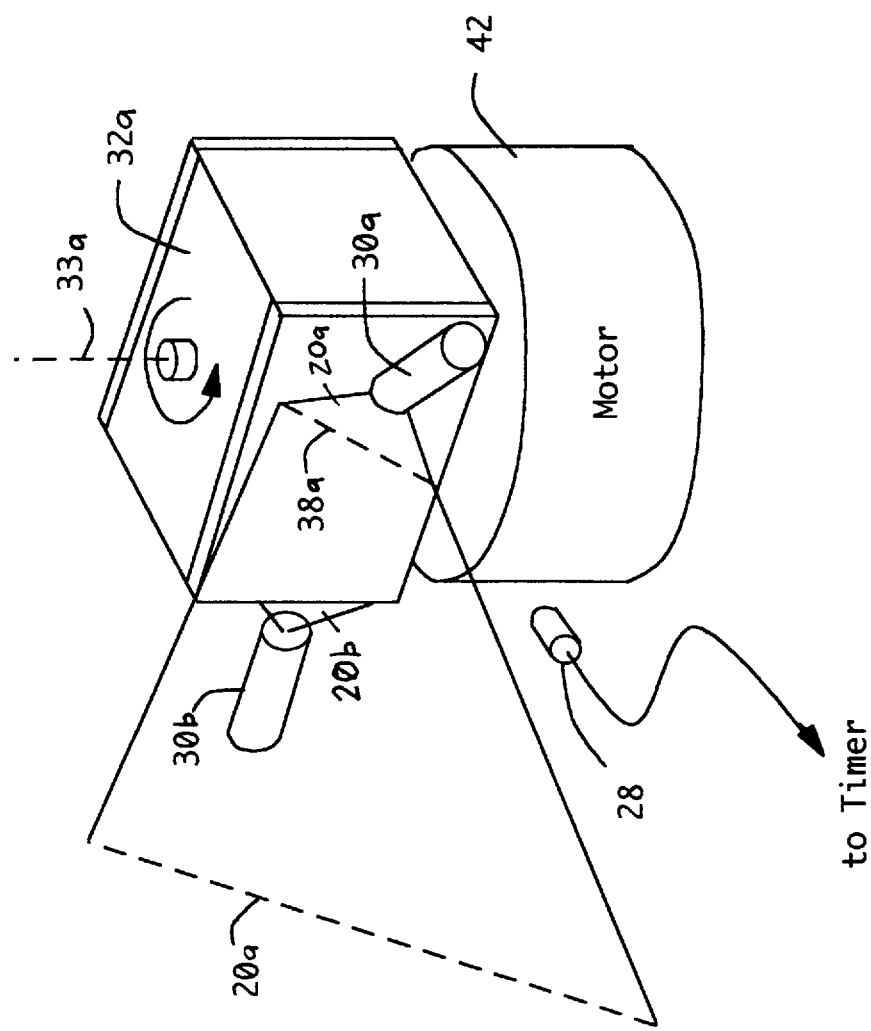
FIGS. 12, 13, and 14 are schematic diagrams of three different optical scanning devices that generate the scanning pattern and synchronization signal required by the system shown in FIG. 11.
Figure 13:
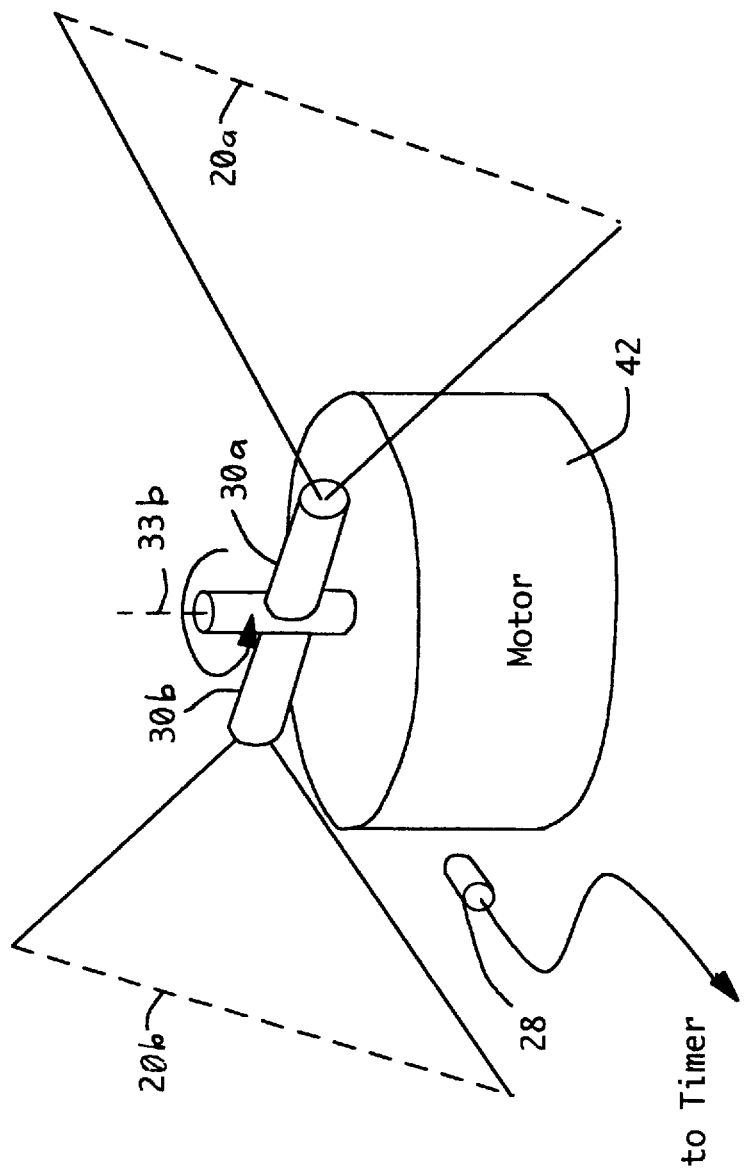
Figure 14:
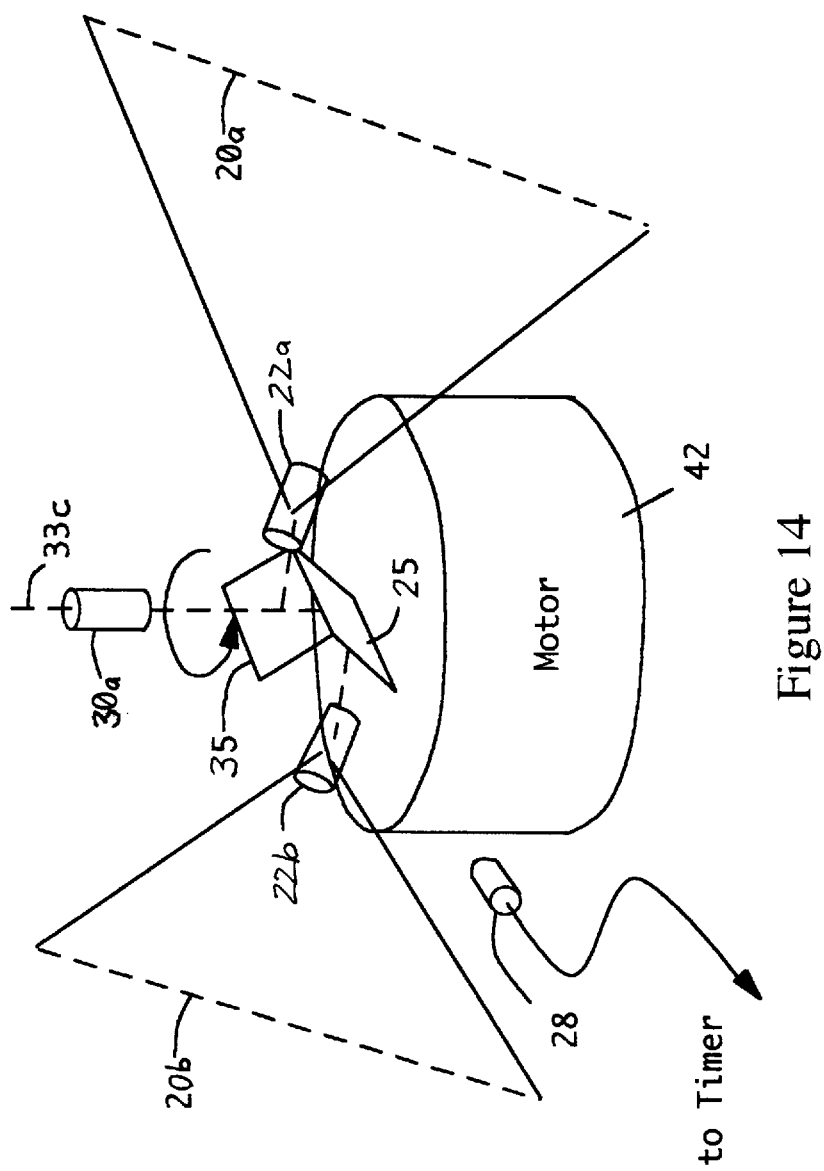

FIGS. 12, 13, and 14 show three different scanner designs that result in a scanning pattern like that shown in FIG. 11. In fact, the most important feature of the scanning pattern is that the angle between the longitudinal axes of the scanning beams be large enough to achieve the desired accuracy. Of secondary importance is the desire to scan a large volume of space. To achieve this, it is desirable for the beams to be swept in a direction somewhat perpendicular to their longitudinal axes. For the scanner designs such as these shown in FIGS. 12, 13, and 14, this leads to a design tradeoff in which an increase in the angle between the beams 20a and 20b (in FIG. 11) leads to a decrease in the volume of the scanned space. Reasonable compromises between these two requirements have been found that lead to systems that scan a large volume of space while maintaining a desired level of accuracy.

FIG. 12 shows a particular scanner design in which two sources of fan-shaped beams 30a and 30b, produce beams 20a and 20b that are intercepted by a rotating mirror polygon 32a. The rotation of the mirror polygon 32a about an axis of rotation 33a is produced by a motor 42. Beam 20a reflects at the mirror face at line 38a to scan the volume of interest. In this schematic, the longitudinal axes of the fan-shaped beams 20a and 20b are oriented at an angle with respect to the vertical so that the resulting scanning beams will be at an angle producing a scanning pattern like that shown in FIG. 11. The mirror polygon can be configured so that the scans from the two beams do not occur simultaneously, thus avoiding an overlap of the two beams. In the design shown in FIG. 12, this is accomplished by having only two of the four total polygon faces being reflective surfaces.

Simultaneously scanning beams can give timing measurements for which an ambiguity exists as to which beam was the cause of the timing signal event. Some overlap in the timing of the scanning beams can be tolerated to the extent that it remains possible to identify which beam causes each event, but if the degree of overlap becomes too large, an ambiguity will arise that makes the determination of the angles increasingly difficult.

A synchronization detector 28 can be incorporated into the scanner such that at least one of the scanning beams is detected at a certain point in the scanning pattern, giving the synchronization signal required by the system.

FIG. 13 shows another scanner design in which two sources 30a and 30b of fan-shaped beams 20a and 20b are fixed directly to the rotating shaft of the motor 42, which causes them to rotate about the motor axis 33b. The sources are positioned so that the longitudinal axes of the emerging beams are at an angle to the vertical. The resulting scanning beams 20a and 20b will then describe a scanning pattern like that show in FIG. 11. As in the other designs shown, a synchronization sensor 28 is positioned to intercept one or both of the scanning beams.

FIG. 14 shows another scanner design in which the two scanning beams 20a and 20b are derived from a single source of collimated light 30a, such as a laser. In this arrangement, the collimated beam from the source 30a is split by a beamsplitter 35, which sends a fraction of the beam toward one of the cylinder lenses 22a. The remainder of the beam is then deflected by a mirror 25 toward a second cylinder lens 22b. The cylinder lenses cause each of the collimated beams to be spread out in one direction, forming the fan-shaped beams 20a and 20b. The axes of the cylinder lenses are oriented to give scanning beams 20a and 20b longitudinal axes that are at an angle to the vertical direction.

The assembly consisting of beamsplitter, mirror, and two cylinder lenses is rotated by fixing them to the rotating shaft of a motor 42, which causes the assembly to rotate about the motor axis 33c. The particular geometry shown here, in which the beam from the light source 30a is directed along the axis of rotation 33c, allows for the light source to remain separate from the remaining assembly, and hence fixed in space. The light source could optionally be fixed to the motor shaft along with the remainder of the optical components shown. This design provides a scanning pattern similar to the pattern produced by the scanner designs of FIGS. 12 and 13, and produces a scanning pattern like that shown in FIG. 11.

Figure 15:
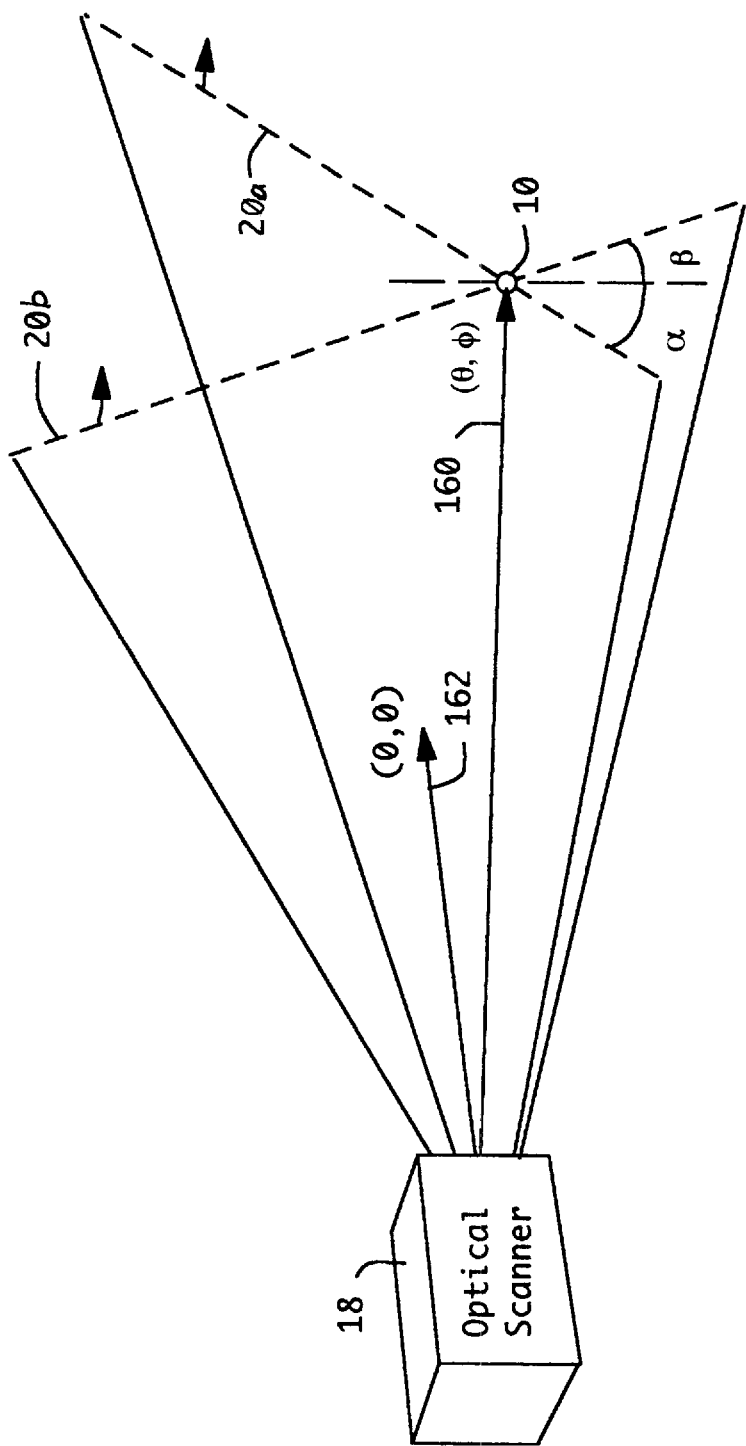
FIG. 15 is a schematic diagram of the generalized system of FIG. 11, showing the geometry for the detection of two scanning beams by a single sensor.

In the system of FIG. 11, the first part of the measurement of position and orientation of the object is the determination of the direction vector $(\theta,\phi)$ for each sensor. FIG. 15 shows the situation for a single sensor (or light source) 10, where the direction vector 160 pointing to the single sensor is measured relative to a direction vector 162 that is fixed with respect to the scanner, shown as the vector (0,0) in this figure. These angles that define each vector (e.g., angles $\theta$ and $\phi$) are the same direction angles referred to above and are obtained from the timing information as described above.

Figure 16:
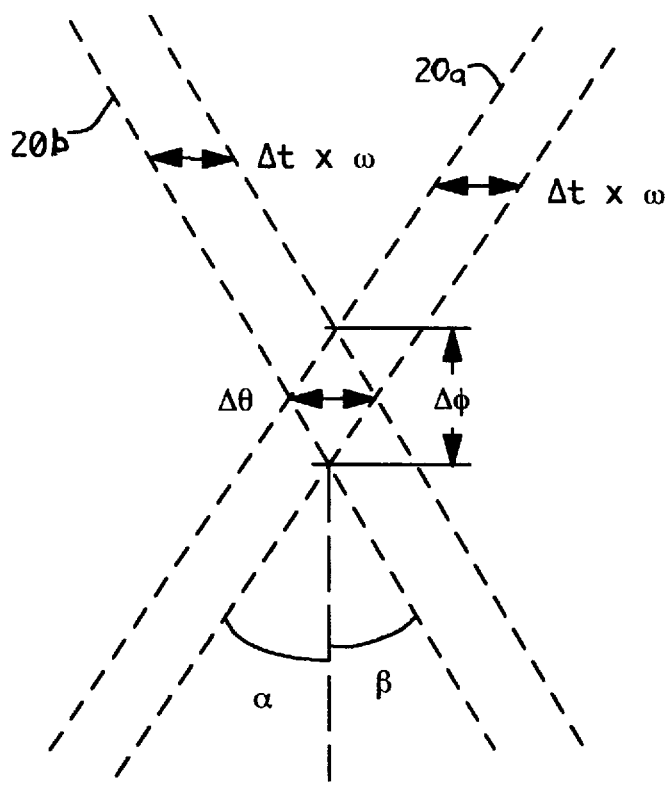
FIG. 16 is a schematic diagram representing the relationship between errors in the time measurements and errors in the angle measurements for a scanning pattern like that shown in FIGS. 11 and 15.

FIG. 16 shows the relationship between the timing measurement inaccuracy of the scanning beams and the resulting inaccuracy in the angles that make up the direction vector for a scanning pattern like that shown in FIGS. 11 and 15. In this figure, the error in the time measurement for the sensor is $\Delta t$, resulting in an error in the angle of the beam of $\Delta t \times \omega$, where $\omega$ is the angular scan rate of the beam. One can see from the figure that as the total angle $(\alpha+\beta)$ gets smaller, the error in $\phi$ gets larger. The mathematical relationship between $\Delta\phi$, $\alpha$, and $\beta$ is:

$$\Delta\phi=(2\Delta t \times \omega)/(\tan \alpha+\tan \beta). \tag{12}$$

In the example shown in FIG. 16, the beams are scanning in the horizontal direction, and the error in the angle $\theta$ is just equal to $\Delta t \times \omega$. This analysis is somewhat different for alternate scanning patterns, but the strong dependence of the resulting accuracy on the angle between the longitudinal axes of the beams remains in all cases.

A reasonable useful lower limit on the total angle $(\alpha+\beta)$ is about 20 degrees. As angles $\alpha$ and $\beta$ are made larger, the volume scanned by each beam becomes smaller. This consideration leads to a practical useful upper limit of about 45 degrees for each angle. The useful range of the total angle $(\alpha+\beta)$ is therefore found to be between 20 and 90 degrees. The construction of working systems has shown that a total angle of 60 degrees $(\alpha+\beta=60)$, and specifically the case in which both $\alpha$ and $\beta$ are 30 degrees, to represent a good compromise.

Figure 5:
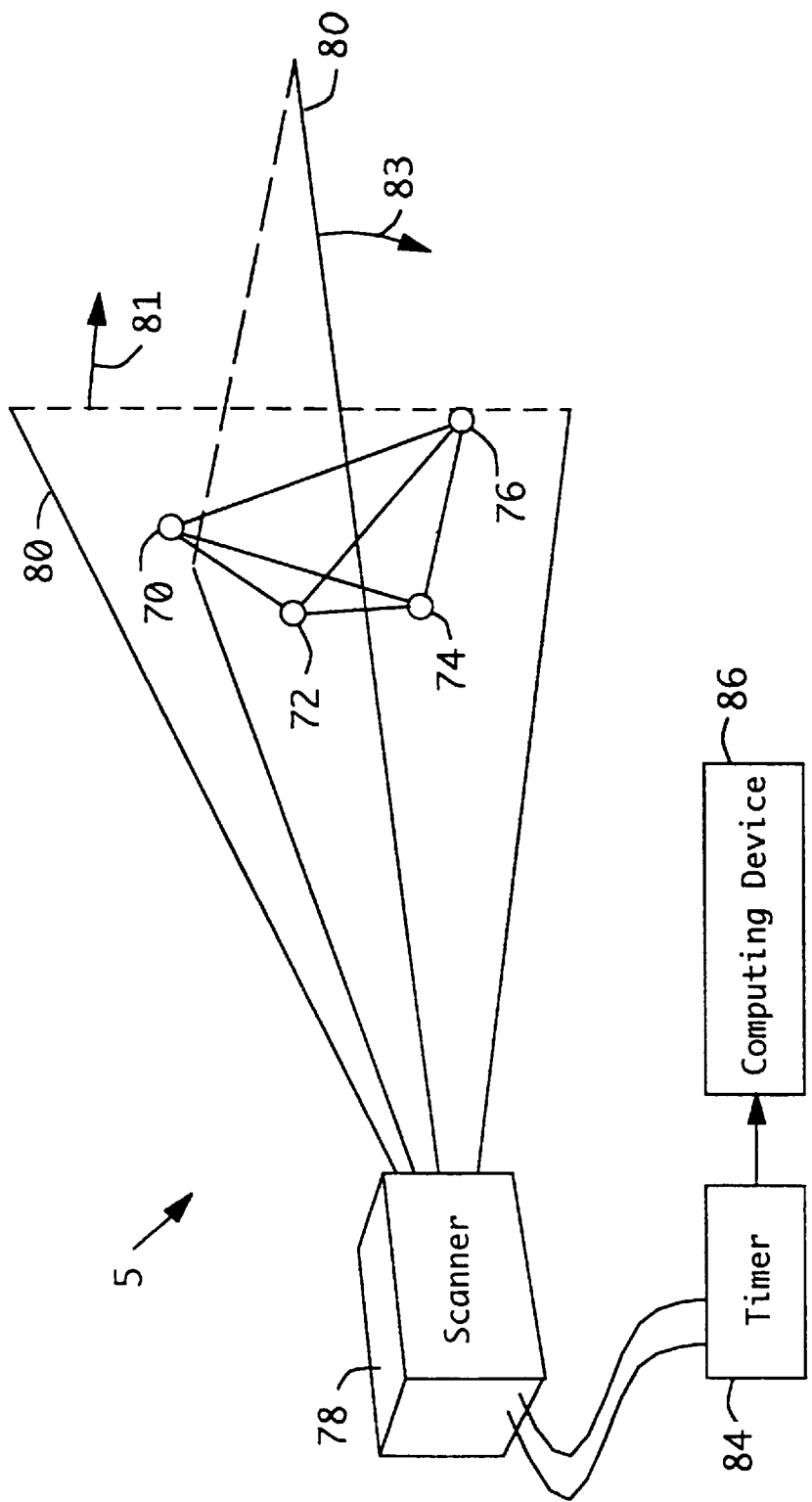
FIG. 5 is a schematic of a system for monitoring the position and orientation of an object utilizing a scanning acceptance beam and at least four light sources.

Another embodiment of the invention is illustrated in FIG. 5, in which the system includes at least four light sources 70, 72, 74, and 76, in a non-coplanar arrangement on an object, and a scanning device 78 that scans a volume of space with a fan-shaped acceptance beam 80 onto at least one light sensor, located within scanner 78. A synchronization signal is required, and can be generated using most of the same methods previously described in reference to the first embodiment. A timer 84 records the timing of the light signals and synchronization signals detected by the scanner, and a computing device 86 carries out the calculation of the position and orientation in the same way as described for the first embodiment.

Figure 6:
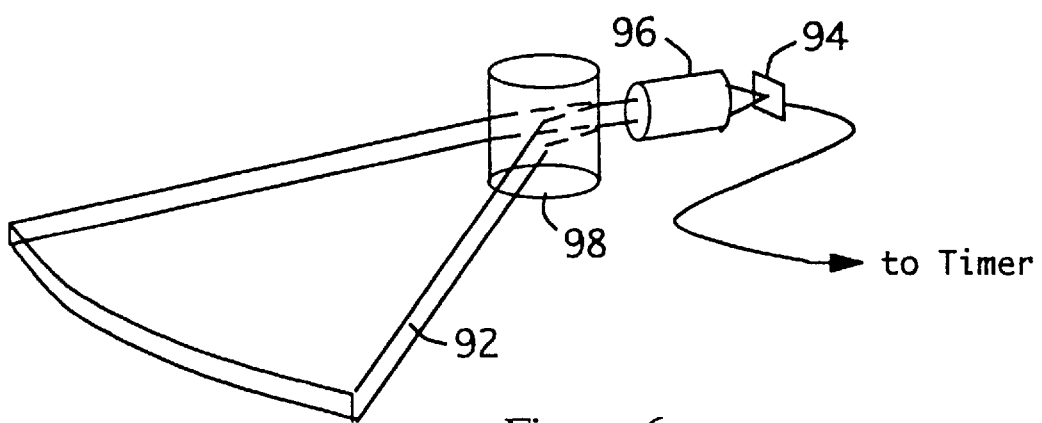
FIG. 6 is a schematic of a light sensor with a fan-shaped acceptance beam.

In general, the design of an acceptance beam scanner can be very similar to a light beam scanner, such as the one shown in FIGS. 2 and 3a to 3c. The main difference is that the light source 30 is replaced by a light detector with a fan-shaped acceptance beam. FIG. 6 is a schematic of a light detector with a fan-shaped acceptance beam 92. This scanning light detector is composed of a light-sensitive element 94 (such as a photodiode), a collimating lens assembly 96 that focuses a narrow pencil beam onto a point, and a cylindrical lens 98 that creates the fan-shaped acceptance beam.

Another difference between the first and second embodiments is that in the second embodiment, detection of the light sources is accomplished by one or more light sensors within the scanner, therefore, the timer is required to record the times of two or more signals (sensor and synchronization), rather than the four or more times as in the first embodiment.

In the second embodiment, a method is required to associate each timing signal with a particular light source on the object. This difficulty is also encountered in systems that employ camera images of point light sources. This problem is not encountered in a system in which multiple sensors sense a scanned light beam since signals from the sensors can be distinguished from one another, for example, by transmitting the signals to a timer on separate wires, and storing the results from each sensor in separate storage latches.

The simplest method of associating each signal with the appropriate light source, and one that requires no additions to the system, is to identify each light source by its position relative to the other three sources. This limits the range of motion that can be usefully measured by the system, such that the relative positions of the light sources as seen by the optical device give an unambiguous identification of each timing signal with a particular sensor.

A number of other embodiments feature alternative scanners that perform the functions required of the invention. For example, the rotating polygon mirror 32 in FIGS. 2 and 3a to 3c can be eliminated and replaced with one or more rotating light sources. Another embodiment includes two or more light sources that produce fan-shaped beams (or detectors with fan-shaped acceptance beams) oriented at different angles and fixed around the periphery of a rotating disk, requiring no mirrors at all. Additional embodiments employ other combinations of optical components (light sources, mirrors, lenses, etc.) to produce the required scanning pattern.

The synchronization signal required by the invention can also be generated in ways other than that shown in FIGS. 2 and 3c. For example, a photo-switch can be used that employs a reflective element fixed to some rotating element of the device. In another method, a synchronization signal is generated in synchrony with the electrical signals that are used to drive the motor. Another alternative is to provide the synchronization signal from an additional light sensor 28 that is at a fixed location relative to the optical scanner as shown in FIG. 1.

Uses of the New Optical System

A useful mode of operation of the invention is to mount the four or more light sensors (or sources) on a rigid frame so that the relative positions of the sensors (or sources) do not vary. This frame is then mounted to a handheld controller or helmet, depending on the application. This mode of operation allows the relative positions of the sensors (or sources) to be measured once and incorporated into the computer program that calculates orientation and position. However, the four or more light sensors or sources can also be positioned on an object individually, and their respective positions measured and recorded.

Figure 7:
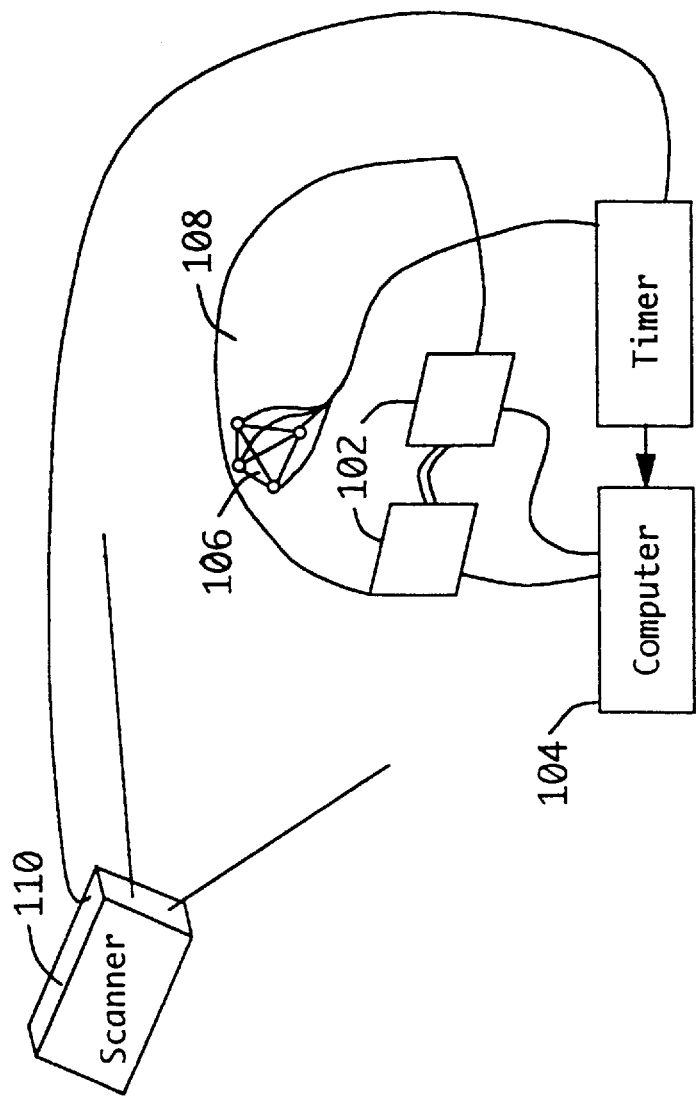
FIG. 7 is a schematic of a virtual reality system.

The optical systems of the invention can be used as an integral part of a virtual reality display. Such a system is illustrated in FIG. 7, in which a visual display 102 is fixed to a person's head on a helmet 108, and a computer 104 presents a view of a particular scene on the visual display that moves in concert with movements of the person's head in such a way as to give the person the illusion of being present within the scene. In a virtual reality system, the four or more light sensors (or sources) 106 are fixed to the headgear 108, e.g., a helmet, that presents the visual display 102. The scanner 110 is situated to scan the area of the headgear. The information on the position and orientation of the person's head provided by the optical system of the invention is used by a computer to control the visual display so that the scene on the visual display changes as the person moves or turns his or her head in the same way it would if the person were actually surrounded by the scene.

Figure 8:
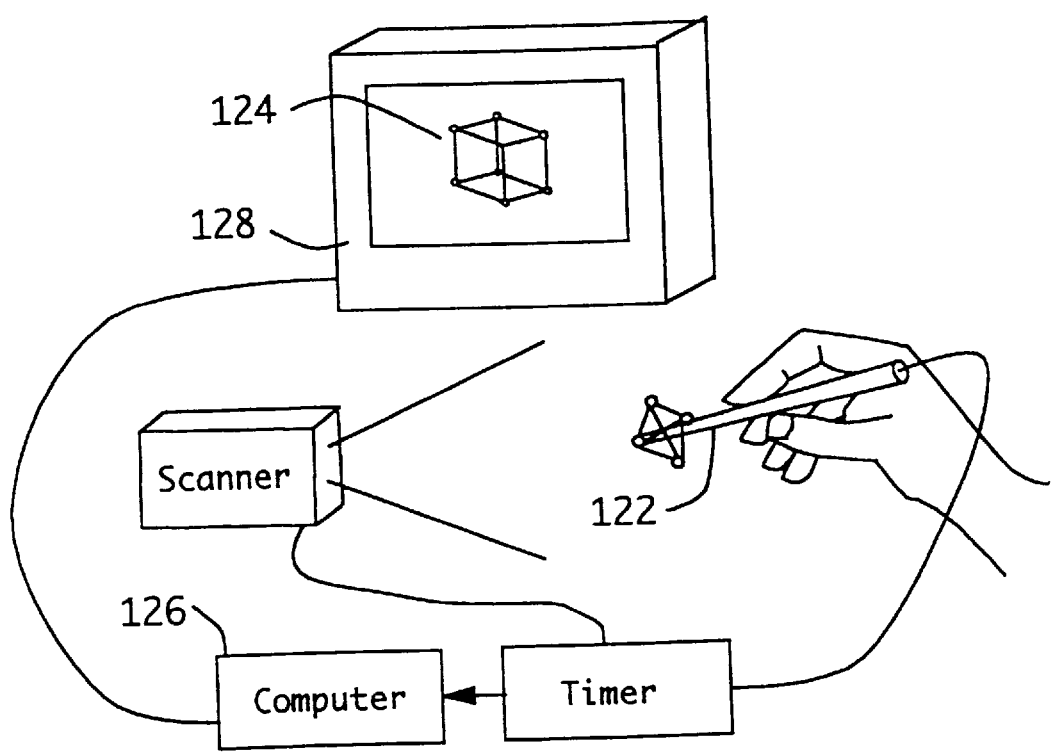
FIG. 8 is a schematic of a system for controlling the orientation of a three-dimensional computer-generated display.

In addition, the optical systems of the invention can be integrated into a system that manipulates computer-generated views of three-dimensional objects. For example, FIG. 8 illustrates a system in which the information on the position and orientation of a hand-held stylus or controller 122 is used to determine the view of the three-dimensional object 124. The view is calculated by a computer 126 and displayed on a visual display device such as a cathode ray tube (CRT) 128.

Figure 9:
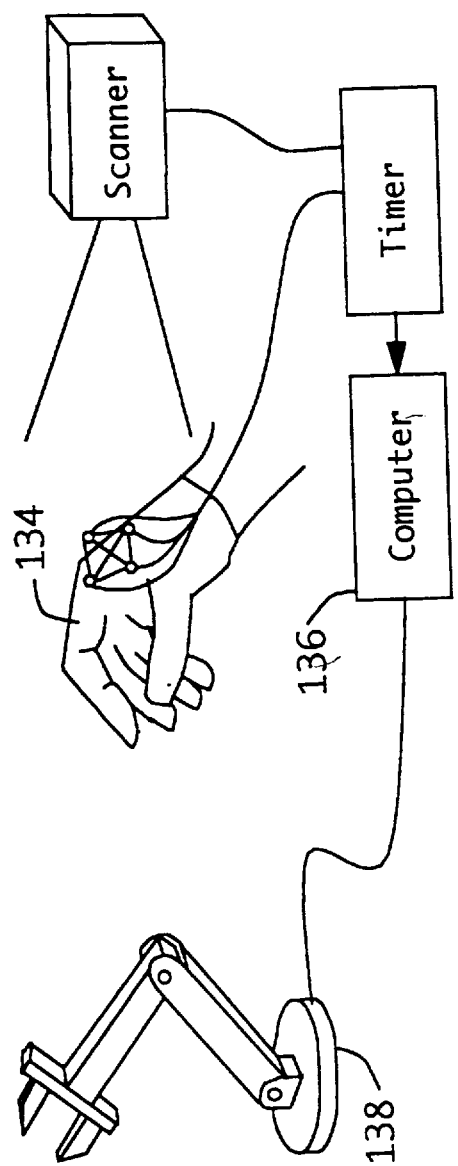
FIG. 9 is a schematic of a system for controlling a remote robotic arm or positioner.

Another use for the new optical systems is in remote or robotic manipulation. For example, FIG. 9 illustrates a system in which a remote robotic arm or positioner 138 moves in a way that mimics a person's or another object's movements. The information on the position and orientation of a part of a person, as indicated by, e.g., a glove 134 worn on the hand, or a helmet worn on the head (not shown in FIG. 9), can be used to directly position the robotic arm or positioner 138 by computer control 136.

Figure 10:
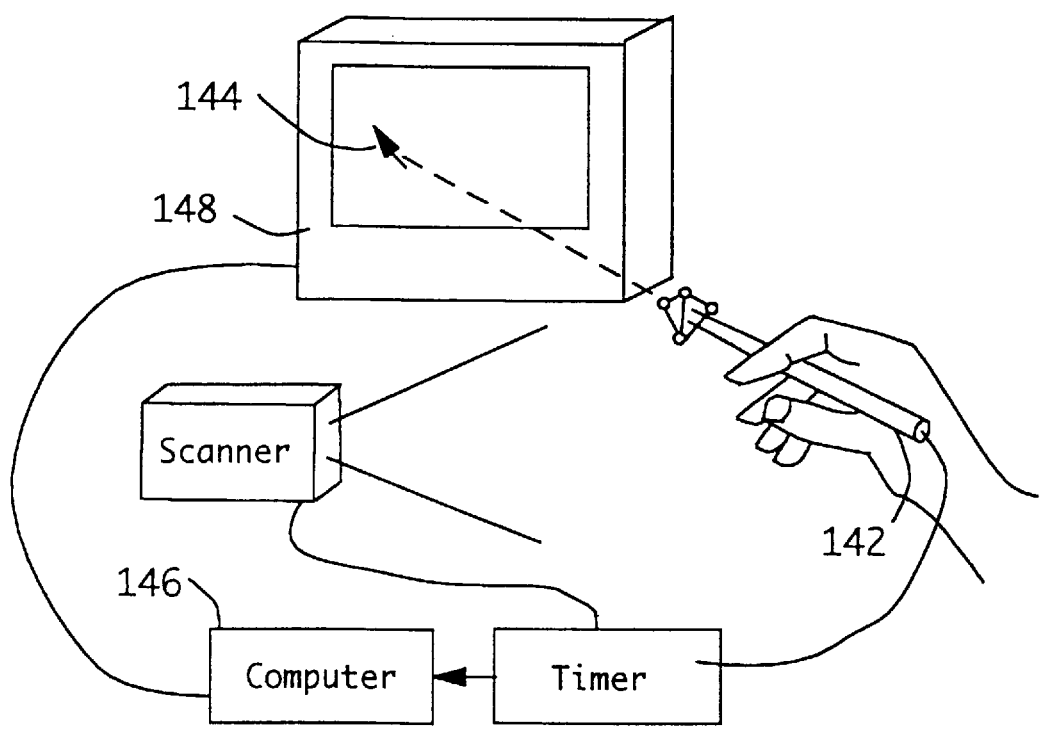
FIG. 10 is a schematic for a system in which a display cursor is controlled by pointing a controller stylus.

In an additional embodiment, the present optical systems can be used in a system that controls a cursor image on a computer display device. FIG. 10 illustrates such a system, in which the position and orientation of a pointing stylus 142 controls the position of a cursor 144 on a display 148. In this system, the computer 146 calculates the position of the cursor 144 based on the position and orientation of the stylus 142.

Other Embodiments

It is to be understood that while the invention has been described in conjunction with the detailed description, that the foregoing description is intended to illustrate and not limit the scope of the invention, which is defined by the scope of the appended claims. Other aspects, a advantages, and modifications are within the scope of the following claims.

What is claimed is:

1. An optical system for monitoring the position and orientation of an object in a frame of reference, the system comprising:

at least four light sensors fixed on the object in a non-coplanar arrangement, each sensor generating a position signal in response to a variation in incident light, and each sensor having known coordinates in the frame of reference of the object;

an optical scanner that generates two fan-shaped light beams, oriented at an angle to each other, that each scan a volume containing the object;

a signal generator that generates a time signal synchronized with a specific point in the scan of at least one of the light beams;

a timer that records the times of position signals generated by the light sensors and time signals generated by the signal generator; and a computing device comprising a memory and a processor, wherein the computing device is electronically linked to the light sensors, the signal generator, and the timer, and wherein the memory is electronically linked to the processor;

wherein the memory stores a program for calculating the position and orientation of the object based on the times recorded by the timer and the coordinates of the light sensors, the processor calculates the position and orientation of the object from the times recorded by the timer, and the memory stores the results of the calculation, thereby monitoring the position and orientation of the object.

2. An optical system of claim 1, wherein the two fan-shaped beams are generated by two separate light sources.

3. An optical system of claim 2, wherein the optical scanner comprises two light sources that each produce a fan-shaped light beam, a motor having an axle, and a mirror fixed to the axle, all arranged so that both beams are intersected by the rotating mirror to produce a repeating pattern of two fan-shaped scanning beams that scan the volume containing the object.

4. An optical system of claim 2, wherein the optical scanner comprises two light sources that each produce a fan-shaped light beam, and a motor having an axle, wherein the two light sources are connected to the axle to produce a repeating pattern of two fan-shaped scanning beams that scan the volume containing the object.

5. An optical system of claim 1, wherein the two fan-shaped beams are generated by a single light source.

6. An optical system of claim 5, wherein the optical scanner comprises one light source that produces a light beam, a motor having an axle, a beam splitter, and two cylindrical lenses, all arranged so that the light beam is split by the beamsplitter and directed to the two cylindrical lenses to produce a repeating pattern of two, fan-shaped scanning beams that scan the volume containing the object.

7. An optical system of claim 1, wherein the two fan-shaped beams are swept in the same direction.

8. An optical system of claim 1, wherein the two fan-shaped beams are swept in opposite directions.

9. An optical system of claim 1, wherein the angle is at least 20 degrees.

10. An optical system of claim 1, wherein the angle is about 60 degrees.

11. An optical system of claim 1, wherein the angle is about 90 degrees.

12. An optical system of claim 3, wherein the signal generator comprises a photo-interrupter and a light interrupting element fixed to the axle of the motor.

13. An optical system of claim 1, further comprising an output device that indicates the results of the calculation.

14. An optical system of claim 1, wherein the object is a headgear for a person's head, the headgear comprising a visual display electronically linked to the computing device and mounted on the headgear to provide a scene to the person, and wherein the computing device calculates the scene based on the position and orientation of the headgear within the frame of reference, and generates the scene on the visual display.

15. An optical system of claim 1, wherein the object is a controller electronically linked to the computing device, and wherein the optical system further comprises an output device electronically linked to the computing device, wherein the output device displays a three-dimensional image, and wherein the computing device calculates the three-dimensional image based on the position and orientation of the controller within the frame of reference, and generates the image on the output device.

16. An optical system of claim 1, wherein the object is a controller electronically linked to the computing device, and wherein the optical system further comprises an output device electronically linked to the computing device, wherein the output device displays a cursor image, and wherein the computing device calculates the position of the cursor image based on the position and orientation of the controller within the frame of reference.

17. An optical system of claim 1, further comprising a positioning device electronically linked to the computing device, wherein the positioning device controls the physical position and orientation of an item in the item's frame of reference, and wherein the computing device calculates and controls the position and orientation of the positioning device in the item's frame of reference based on the position and orientation of the object within the object's frame of reference.

18. A method of monitoring the position and orientation of an object in a frame of reference, the method comprising the steps of:

fixing at least four light sensors on the object in a non-coplanar arrangement to provide each sensor with known coordinates in the frame of reference of the object, wherein each sensor generates a position signal in response to a variation in incident light;

locating the object so that at least four of the light sensors are within a volume scanned by an optical scanner, the scanner generating two fan-shaped light beams, oriented at an angle to each other, that each scan a volume containing the object;

generating a synchronization signal that is synchronized in time with a specific point in the scan of at least one of the light beams;

recording the times of position signals from the light sensors and the synchronization signal;

and calculating the position and orientation of the object based on the recorded times of position signals from the light sensors, the synchronization signal, and the coordinates of the light sensors in the frame of reference of the object.

19. An optical system for monitoring the position and orientation of an object in a frame of reference, the system comprising:

at least four light sources fixed on the object in a non-coplanar arrangement, each source having known coordinates in the frame of reference of the object;

an optical scanner that focusses two fan-shaped acceptance beams, oriented at an angle to each other, onto at least one light sensor and scans the acceptance beams through a volume containing the object, the light sensor generating a position signal in response to a variation in incident light;

a signal generator that provides a time signal synchronized with a specific point in the scan of at least one of the acceptance beams;

a timer that records the times of position signals generated by the light sensor and time signals generated by the signal generator; and a computing device comprising a memory and a processor, wherein the computing device is electronically linked to the light sensor, the signal generator, and the timer, and wherein the memory is electronically linked to the processor;

wherein the memory stores a program for calculating the position and orientation of the object based on the times recorded by the timer and the coordinates of the light sources, the processor calculates the position and orientation of the object from the times recorded by the timer, and the memory stores the results of the calculation, thereby monitoring the position and orientation of the object.

20. An optical system of claim 19, wherein the two fan-shaped acceptance beams are swept in the same direction.

21. An optical system of claim 19, wherein the two fan-shaped acceptance beams are swept in opposite directions.

22. An optical system of claim 19, wherein the optical scanner comprises a light sensor that detects light from both fan-shaped acceptance beams, a motor having an axle, a mirror fixed to the axle, and a pair of flat mirrors, all arranged to scan the acceptance beams through a volume containing the object.

23. An optical system of claim 22, wherein the signal generator comprises a photo-interrupter and a light interrupting element fixed to the axle of the motor.

24. An optical system of claim 19, further comprising an output device that indicates the results of the calculation.

25. An optical system of claim 19, wherein the object is a headgear for a person's head, the headgear comprising a visual display electronically linked to the computing device and mounted on the headgear to provide a scene to the person, and wherein the computing device calculates the scene based on the position and orientation of the headgear within the frame of reference, and generates the scene on the visual display.

26. An optical system of claim 19, wherein the object is a controller electronically linked to the computing device, and wherein the optical system further comprises an output device electronically linked to the computing device, wherein the output device displays a three-dimensional image, and wherein the computing device calculates the three-dimensional image based on the position and orientation of the controller within the frame of reference, and generates the image on the output device.

27. An optical system of claim 19, wherein the object is a controller electronically linked to the computing device, and wherein the system further comprises an output device electronically linked to the computing device, wherein the output device displays a cursor image, and wherein the computing device calculates the position of the cursor image based on the position and orientation of the controller within the frame of reference.

28. An optical system of claim 19, further comprising a positioning device electronically linked to the computing device, wherein the positioning device controls the physical position and orientation of an item in the item's frame of reference, and wherein the computing device calculates and controls the position and orientation of the positioning device in the item's frame of reference based on the position and orientation of the object within the object's frame of reference.

* * * * *